US008702495B2

(12) United States Patent
Hornik et al.

(10) Patent No.: US 8,702,495 B2
(45) Date of Patent: Apr. 22, 2014

(54) WAGERING GAME WITH BONUS GAME HAVING ENHANCED PLAYER-SELECTION FEATURES

(75) Inventors: Jeremy M. Hornik, Chicago, IL (US); Pamela S. Smith, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 923 days.

(21) Appl. No.: 12/489,997

(22) Filed: Jun. 23, 2009

(65) Prior Publication Data

US 2009/0318218 A1 Dec. 24, 2009

Related U.S. Application Data

(60) Provisional application No. 61/132,944, filed on Jun. 24, 2008.

(51) Int. Cl.
*A63F 9/24* (2006.01)
*A63F 13/00* (2006.01)

(52) U.S. Cl.
USPC .................. 463/20; 463/16; 463/21; 463/22; 463/25; 273/138.1; 273/138.2; 273/143 R

(58) Field of Classification Search
USPC ................ 463/16, 20, 21, 22, 25; 273/138.1, 273/138.2, 143 R
See application file for complete search history.

(56) References Cited

U.S. PATENT DOCUMENTS

| | | | | |
|---|---|---|---|---|
| 5,788,573 | A | 8/1998 | Baerlocher et al. | 463/16 |
| 5,823,874 | A | 10/1998 | Adams | 463/17 |
| 5,848,932 | A | 12/1998 | Adams | 463/20 |
| 6,533,273 | B2 | 3/2003 | Cole et al. | 273/138.1 |
| 6,612,575 | B1 | 9/2003 | Cole et al. | 273/138.1 |
| 7,513,828 | B2 | 4/2009 | Nguyen et al. | 463/26 |
| 7,713,119 | B2 * | 5/2010 | Pacey et al. | 463/20 |
| 7,874,904 | B2 * | 1/2011 | Randall | 463/16 |
| 2002/0016200 | A1 * | 2/2002 | Baerlocher et al. | 463/20 |
| 2002/0142823 | A1 * | 10/2002 | DeMar et al. | 463/16 |
| 2003/0157978 | A1 | 8/2003 | Englman | 463/16 |
| 2003/0224851 | A1 * | 12/2003 | Gilmore | 463/20 |
| 2004/0067792 | A1 * | 4/2004 | Baerlocher et al. | 463/20 |
| 2004/0102237 | A1 * | 5/2004 | Baerlocher | 463/16 |
| 2005/0032567 | A1 * | 2/2005 | Baerlocher et al. | 463/16 |
| 2005/0054416 | A1 * | 3/2005 | Hostetler et al. | 463/16 |
| 2006/0189379 | A1 | 8/2006 | Pacey | 463/20 |

* cited by examiner

*Primary Examiner* — William Brewster
*Assistant Examiner* — Ryan Hsu
(74) *Attorney, Agent, or Firm* — Nixon Peabody LLP

(57) ABSTRACT

A system and method for conducting a wagering game includes a feature having a plurality of selectable elements associated with respective outcomes. The feature further includes a path having a plurality of spaces. The plurality of spaces is associated with respective special rules. Each respective special rule is capable of being active or inactive. One embodiment of a method includes (a) successively selecting different ones of the plurality of selectable elements; (b) for each selected element, identifying a space of the plurality of spaces to be associated with the selected element; and (c) modifying the outcome associated with each selected outcome with the special rule associated with the identified space if the special rule for the identified space is active.

25 Claims, 7 Drawing Sheets

WAGERING GAME WITH BONUS GAME HAVING ENHANCED PLAYER-SELECTION FEATURES

CROSS REFERENCE TO RELATED APPLICATION

This application claims the benefit of priority of U.S. Provisional Patent Application No. 61/132,944, filed Jun. 24, 2008, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and methods for playing wagering games, and more particularly, to wagering games having a bonus game with enhancements to a player-selection feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

In one embodiment, a method for conducting a wagering game is disclosed. The wagering game includes a feature having a plurality of selectable elements associated with respective outcomes. The feature further includes a path having a plurality of spaces. The plurality of spaces is associated with respective special rules. Each respective special rule is capable of being active or inactive. The method comprises the acts of (a) successively selecting different ones of the plurality of selectable elements, (b) for each selected element, identifying a space of the plurality of spaces to be associated with the selected element, and (c) modifying the outcome associated with each selected outcome with the special rule associated with the identified space if the special rule for the identified space is active.

In another embodiment, a method for conducting a wagering game is disclosed. The wagering game includes a feature having a plurality of selectable elements associated with respective outcomes. The feature further includes a path having a plurality of spaces. The plurality of spaces is associated with respective special rules and is capable of being active or inactive. The method includes indicating with an indicator a first one of the spaces of the path being associated with a respective special rule and receiving a selection from the plurality of selectable elements in the feature. If the first one of the spaces is associated with an active special rule, the method includes modifying the outcome associated with the selection based on the active special rule and awarding a player the modified outcome.

In yet another embodiment, a gaming system comprises a wager input device for receiving a wager from a player to play a wagering game and at least one display for displaying an array of selectable elements associated with respective outcomes. The at least one display also displaying a path having a plurality of spaces. The spaces are associated with respective modifiers for modifying the outcomes of the selectable elements. The modifiers are capable of being active or inactive. The gaming system further comprising a player input device for successively selecting different ones of the selectable elements. In response to each of the selectable elements being selected, each selected element is associated with a space of the plurality of spaces and the respective modifier modifies the outcome of each selected element if the respective modifier is active.

In yet a further embodiment, a gaming system comprises means for receiving a wager from a player to play a wagering game. The gaming system also comprises means for displaying an array of selectable elements associated with respective outcomes. The displaying means also displays a path having a plurality of spaces. The spaces are associated with respective modifiers for modifying the outcomes of the selectable elements. The modifiers are capable of being active or inactive. The gaming system further comprising means for successively selecting different ones of the selectable elements. In response to each of the selectable elements being selected, each selected element is associated with a space of the plurality of spaces and the respective modifier modifies the outcome of each selected element if the respective modifier is active.

In yet a further embodiment, a method for conducting a wagering game is disclosed. The wagering game includes a feature having a plurality of selectable elements associated with respective outcomes. The feature further includes a path having a plurality of spaces. The plurality of spaces are associated with respective special rules. Each respective special rule is capable of being active or inactive. The method comprises the acts of selecting a first one of the plurality of selectable elements; for the first one of the selected elements, identifying a space of the plurality of spaces to be associated with the first one of the selected elements; modifying the outcome associated with the first one of the selected elements with the special rule associated with the identified space if the special rule for the identified space is active; selecting a second one of the plurality of selectable elements; for the second one of the selected elements, identifying a space of the plurality of spaces to be associated with the second one of the selected elements; and modifying the outcome associated with the second one of the selected elements with the special rule associated with the identified space if the special rule for the identified space is active.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
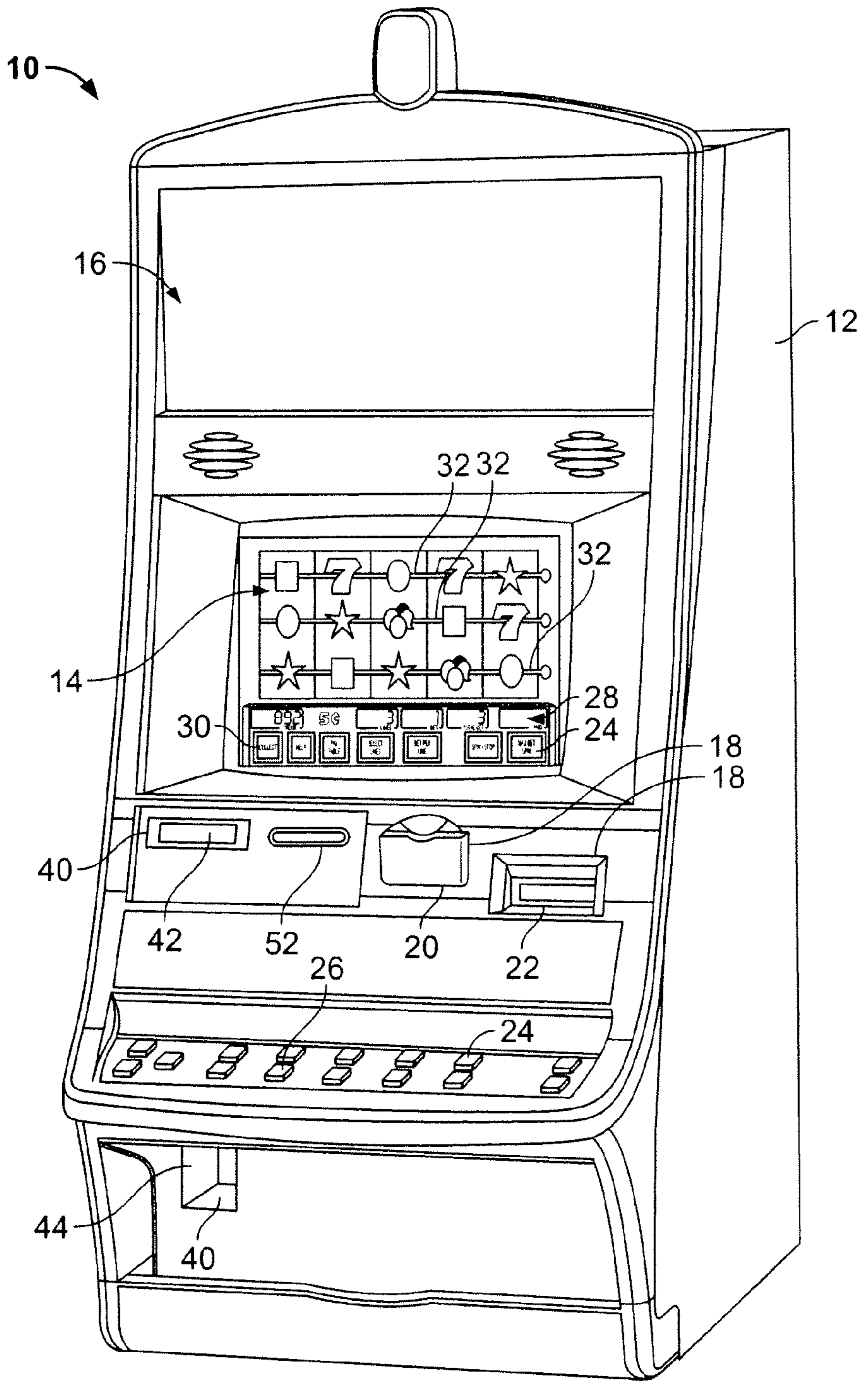
FIG. 1*a* is a perspective view of a free standing gaming machine.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
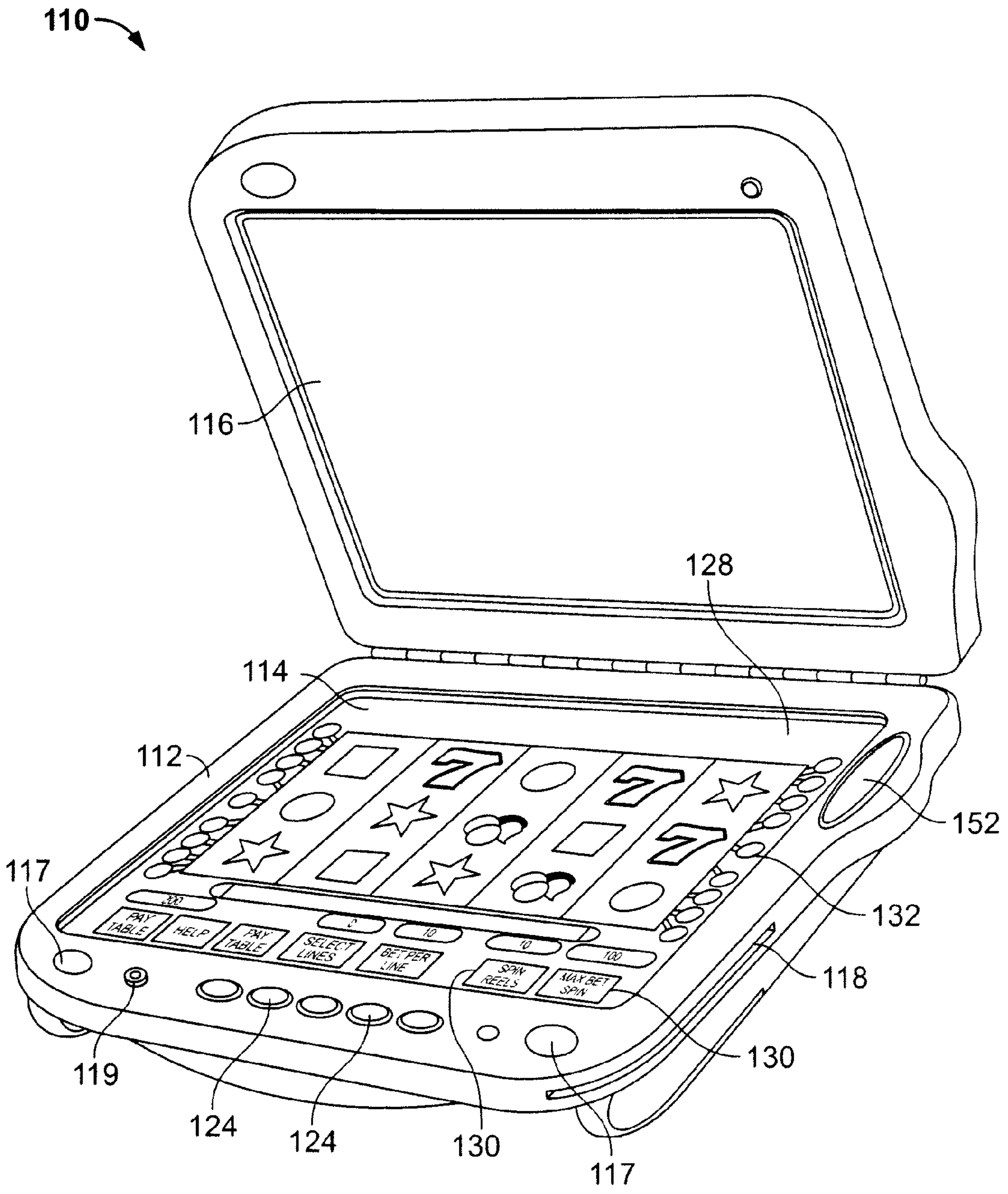
FIG. 1*b* is a perspective view of a handheld gaming machine.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126.

Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
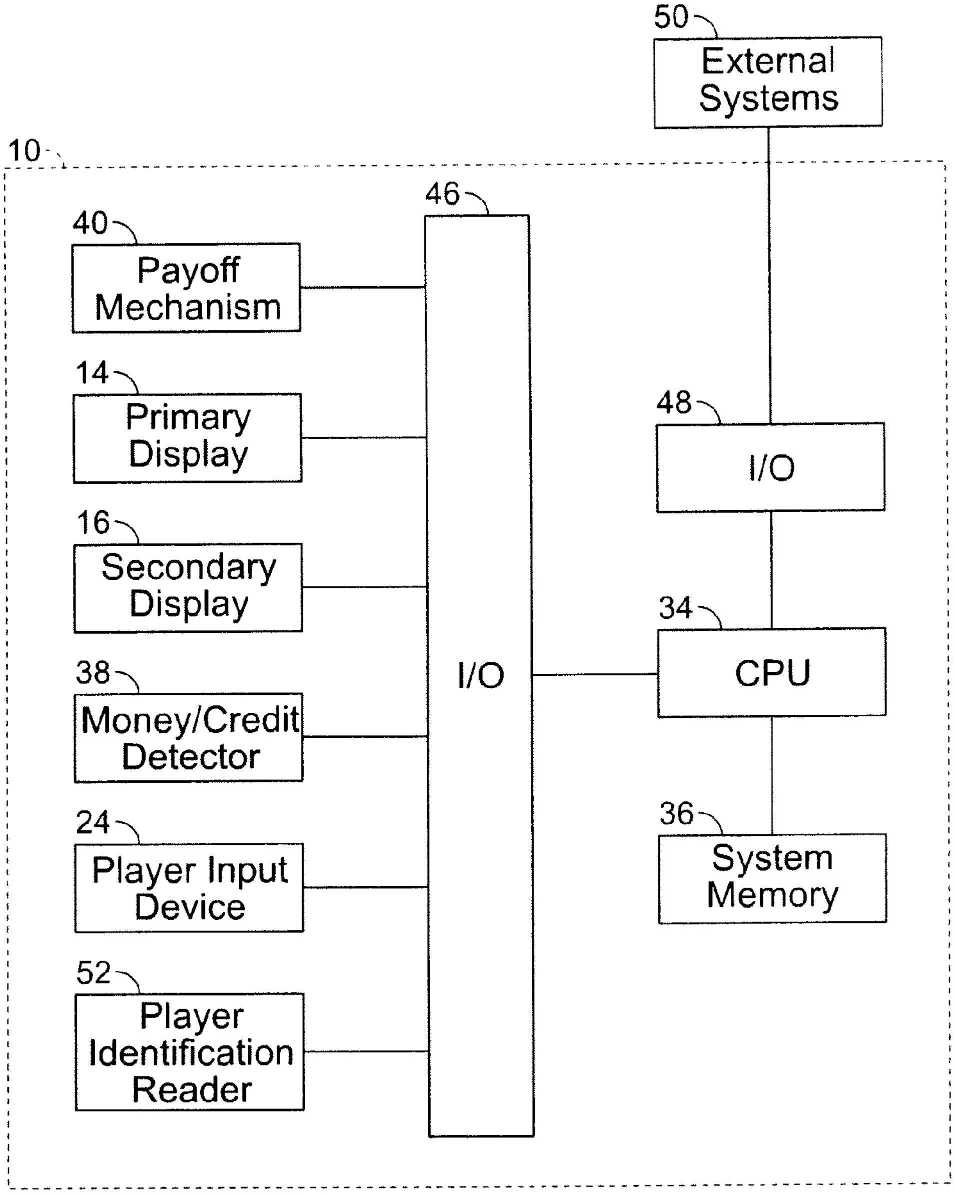
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
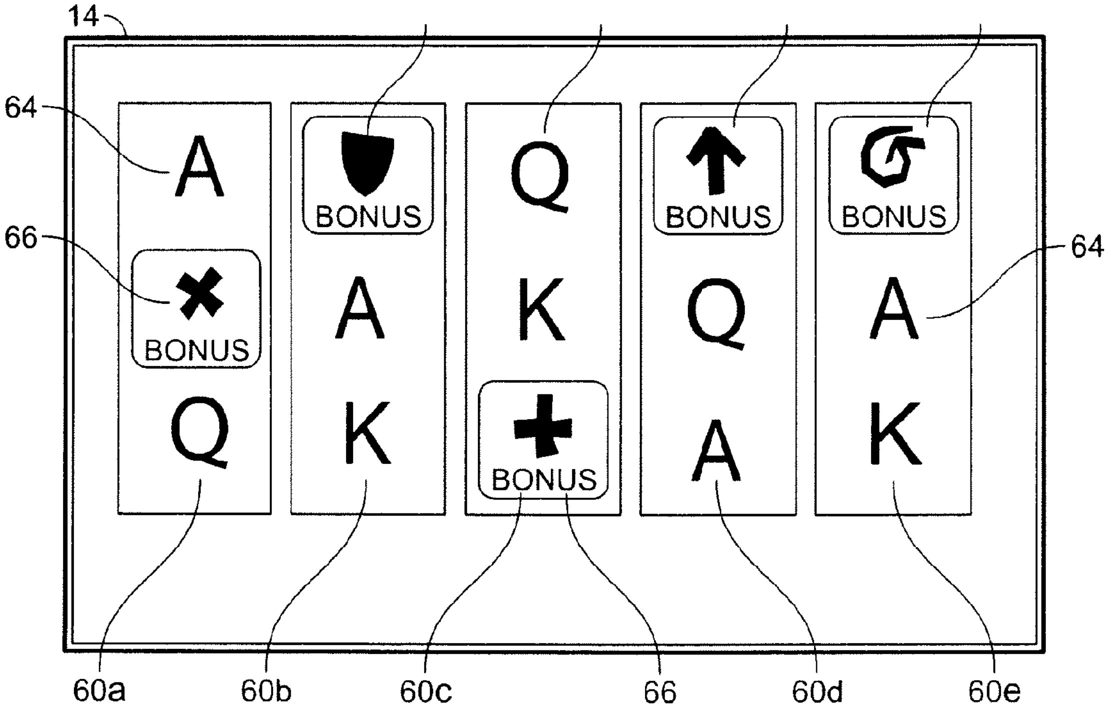
FIGS. 3 and 4 are representative displays of a wagering game having bonus-game-triggering symbols in accord with at least some aspects of an embodiment of the present concepts.

Turning now to FIG. 3, the primary display 14 depicts an example of at least some aspects of the present concepts wherein there is displayed a wagering game. A plurality of symbols indicative of a randomly-selected wagering game outcome of a basic game are displayed on the primary display 14. In this embodiment, the basic game is a slot machine game, with symbols on five different reels 60*a-e*. The reels 60*a-e* may be either traditional mechanical reels, electromechanical reels, or they may be computer-generated images of reels, with each reel composed of a plurality of symbols 64.

During the basic game, the player places a wager which may be associated with a number of pay lines (not shown). Once the player has placed the wager, the reels 60*a-e* begin to spin. Once the reels 60*a-e* stop, the symbols 64 on the reels 60*a-e* indicate a randomly-selected outcome of the basic game. In addition to traditional symbols 64 that may be displayed on a gaming machine, FIG. 3 also displays a set of special symbols for triggering a bonus game. For example, in FIG. 3, symbols 66 illustrate five different bonus-game triggering symbols. The bonus-game-triggereing symbols 66 that are shown include an "X," a "Shield," a "Plus," an "Up Arrow" and a "Spiral." An occurrence of a predetermined number of these bonus-triggering symbols 66 triggers a bonus game to start. As discussed in more detail below, the symbols 66 also determine which special features are available in the bonus game.

Figure 4:
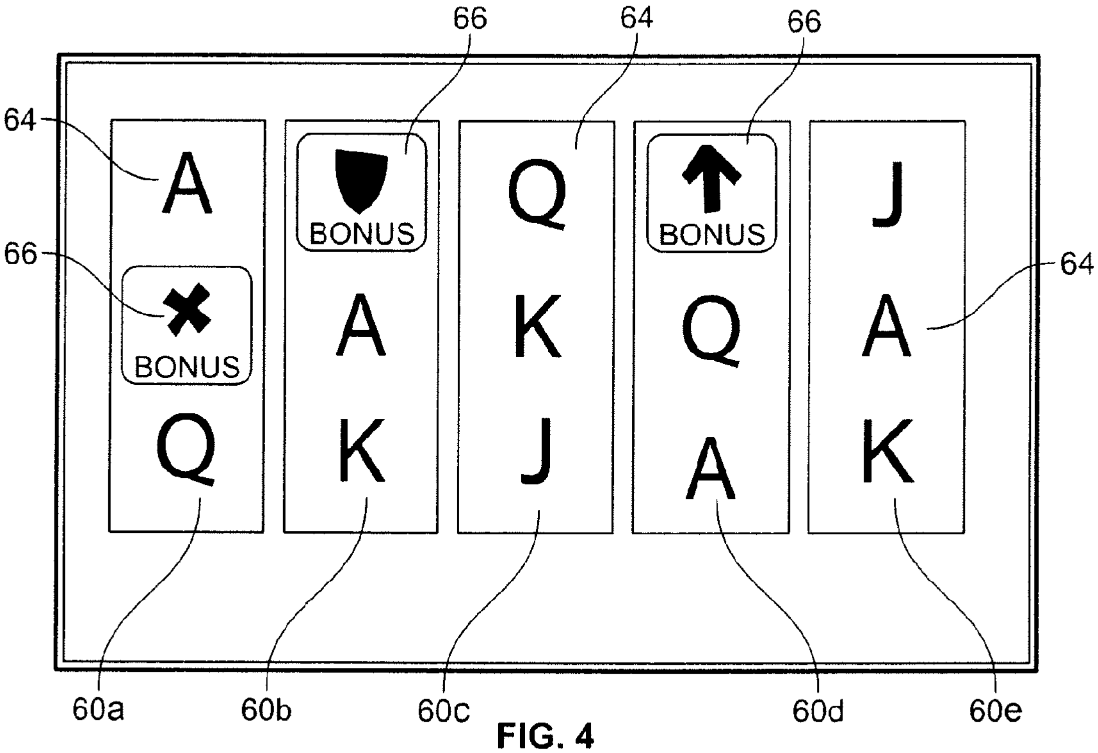

Turning to FIG. 4, another outcome of the basic game is illustrated. In this embodiment, the outcome includes three bonus-game-triggering symbols 66 on the reels 60*a*, 60*b* and 60*d*. The symbols include the "X," the "Shield" and the "Up Arrow." The presence of these three symbols 66 in the basic game triggers a bonus game; however, it will be appreciated that other numbers and variations of the symbols 66 may also trigger the bonus game. For example, any combination of at least three of the symbols 66 may cause the bonus game to be triggered.

Figure 5:
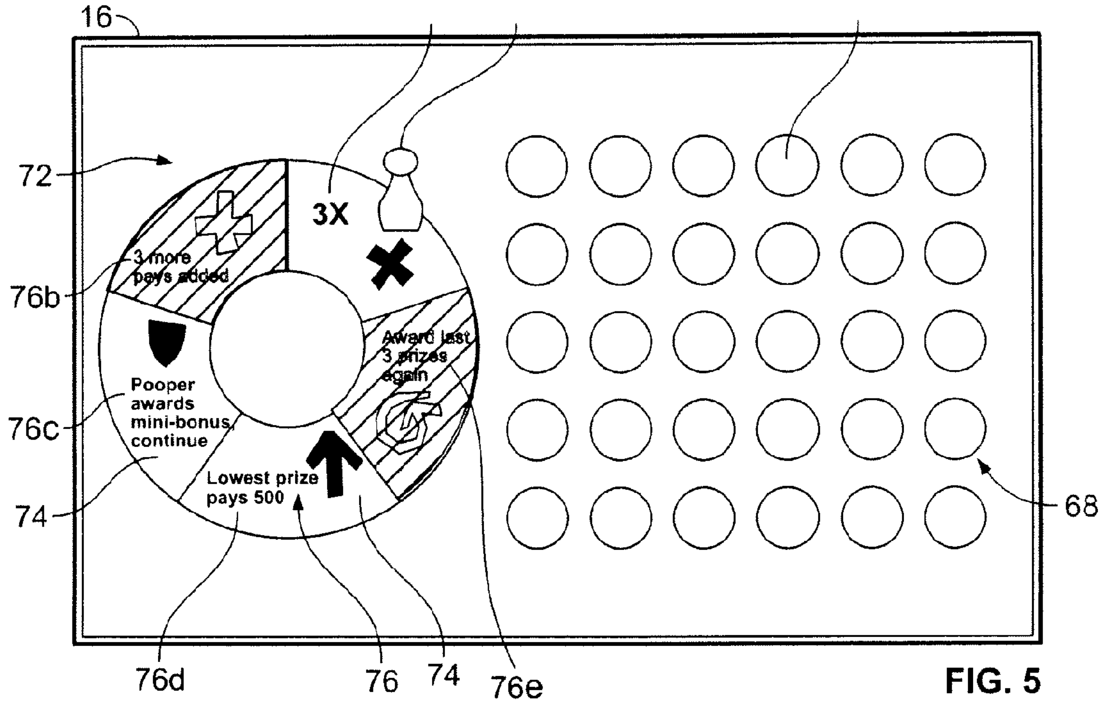
FIGS. 5-8 are representative displays of a bonus game with enhancements to a player-selection feature in accord with at least some aspects of an embodiment of the present concepts.

Some embodiments of the bonus game that may be triggered are shown in FIGS. 5-8. In these embodiments, a secondary display 16 (or primary display 14) displays an array 68 of player-selectable elements 70. The array 68 may be in the form of a square grid, such as shown in FIG. 5, having a predetermined number of rows and columns, e.g., six rows and six columns. The array 68 may include other configurations, in addition to a square grid, such as a rectangular grid, a circular arrangement, a triangular arrangement, etc. The array 68 could also be configured as a board-type game or may include a random configuration. In some embodiments, the outcome of the basic game or the symbols 66 that triggered the bonus game may affect the bonus game configuration. Regardless of the configuration of the array 68 of player-selectable elements 70, each of the player-selectable elements 70 is associated with an outcome, such as a credit award, a multiplier, a game-terminator, etc.

According to some concepts, each of the player-selectable elements 70 may be associated with more than one outcome. For example, a first player-selectable element 70 may be associated with a credit award or a multiplier, while a second player-selectable element 70 may be associated with a multiplier or a game-terminator. In some embodiments, a player-selectable element 70 may be associated with more than two outcomes, i.e., three or more outcomes. The particular outcome that is revealed to the player (and which may be modified by a special rule as indicated below) may depend upon the direction in which the player "drags" his or her finger over the player-selectable object 70 when it is selected by the player. Thus, each direction may correspond to a different result. In one example, if a player drags his finger over the player-selectable object 70 to the left, a credit award is revealed to the player. If the player drags his finger over the same player-selectable object 70 to the right, a multiplier is revealed to the player. It is contemplated that more than two directions may be identified, i.e., left, right, up, down, such that each player-selectable object 70 is associated with multiple outcomes depending on the direction in which a player indicates a gesture, i.e., drags a finger, to select a particular player-selectable object 70.

In operation, the outcomes that could be revealed are based on the angle that the "drag" type gesture occurs. To further illustrate this concept by way of another example, a bonus game may be provided that includes bowling pins at the end of a bowling alley. During the bonus game, the player is allowed to place his or her finger on a bowling ball and make a drag gesture to indicate where the player wants the bowling ball to go. Angles originating from the bowling ball would be the "picks." Thus, dragging a player's finger at a 45 degree angle from the bowling ball would correspond to a first outcome, dragging the player's finger at a 90 degree angle would correspond to a second outcome, etc. The directions/angles and the corresponding outcomes may be known to the player before making the gestures, or some or all of the directions/angles and corresponding outcomes may be unknown and later revealed to the player after one or more gestures are made by the player.

In other embodiments, different types of gestures may be used to indicate an outcome associated with a player-selectable object 70. For example, a player may be able to "spin" a player-selectable object 70 in a particular direction, i.e., left or right. Each direction would reveal a different outcome, as discussed above. For example, if a player spins a player-selectable object 70 to the left, i.e., counterclockwise, a game terminator would be revealed. If a player spins a player-selectable object 70 to the right, i.e., clockwise, a credit award would be revealed. It is contemplated that many other types of gestures may be detected and used to indicate a particular outcome (from a plurality of possible outcomes) associated with a player-selectable object 70.

In yet other embodiments, an indicator or "reveal" may be provided on the primary display 14 or secondary display 16 that shows the player what outcome would have occurred had the player-selectable object 70 been spun or dragged in a different direction. Alternatively, or additionally, the indicator or "reveal" may show the outcomes for unselected player-selectable objects 70. A player would then be able to see whether spinning or dragging the player-selectable object 70 in another direction would have revealed a better (or worse) outcome or whether selecting a different player-selectable object 70 would have provided a chance at better (or wise) outcomes.

In addition to the array 68 of player-selectable elements 70, the bonus game includes a path 72 having spaces 74 corresponding to the set of bonus-game-triggering symbols 66 of the basic game. The path 72 may appear adjacent to the array 68 or in another location on the display 16. The spaces 74 that correspond to the set of bonus-game-triggering symbols 66 include special rules 76 for modifying the play of the bonus game. In some embodiments, the special rules 76 are capable of being in an active mode or an inactive mode, which may depend on the outcome of the basic game.

For example, the spaces 74 include the set of five bonus-game-triggering symbols 66 that are displayed in the basic game, i.e., the "X," the "Shield," the "Plus," the "Up Arrow" and the "Spiral." The path 72 of spaces 74 may be in a circular configuration, as shown in FIGS. 5-8; however, it is contemplated that other configurations may be used that allow a player to travel along the path in a predetermined or in a random manner. The special rules 76 that are associated with each of the symbols 66 may include modifications that enhance aspects of the bonus game.

To illustrate the use of the array 68 of player-selectable elements 70 and the path 72 having special rules 76, FIG. 5 shows a marker 78 that is adapted to move along the spaces 74 of the path 72. As indicated above, every space 74 on the path 72 has a special rule 76, or "power-up," that changes or modifies the play of the bonus game, i.e., affects an outcome associated with a selected player-selectable element 70. On the "X" space, for example, the special rule 76*a* provides that an award that is selected from the player-selectable elements 78 is multiplied by a factor, i.e., "3X." However, only some of the special rules 76 may be activated based on the outcome of the basic game. For example, in FIG. 5, only the special rules 76*a*, 76*c* and 76*d* are activated because only the "X," "Shield" and "Up Arrow" are the symbols that triggered the bonus game, as shown in FIG. 4. Thus, in the examples shown in FIGS. 5-8, the spaces 74 associated with special rules 76*b* and 76*e* are inactive, as illustrated by the cross-hatching on those spaces.

Figure 6:
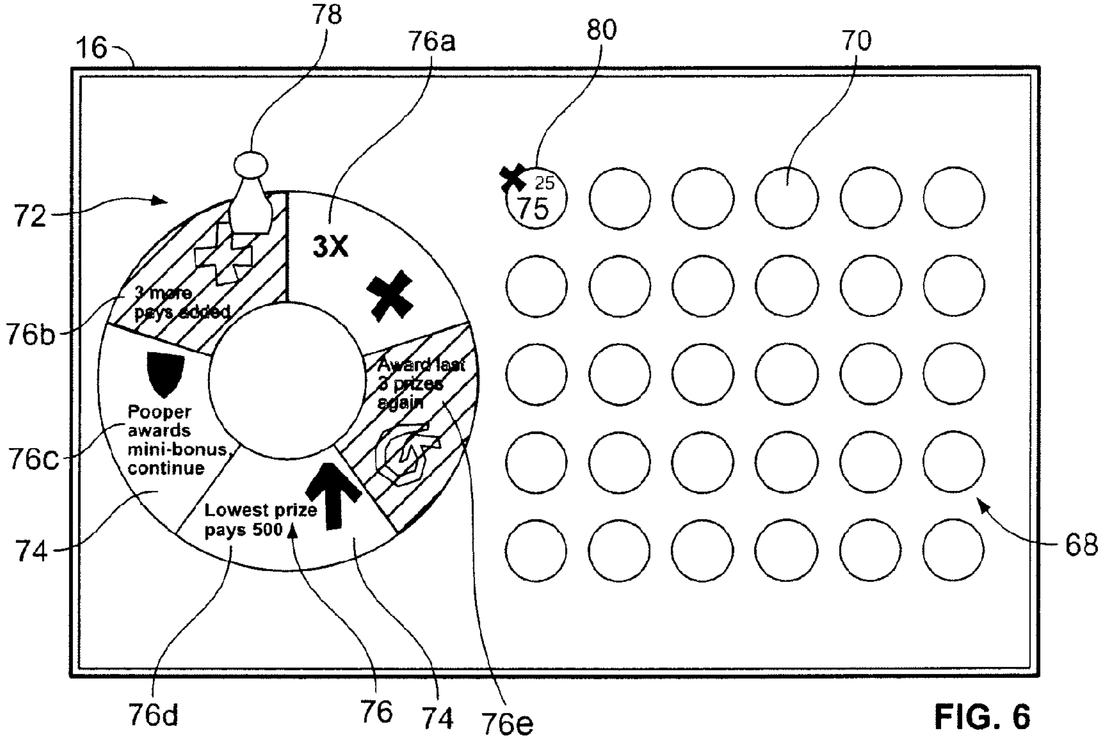
Figure 7:
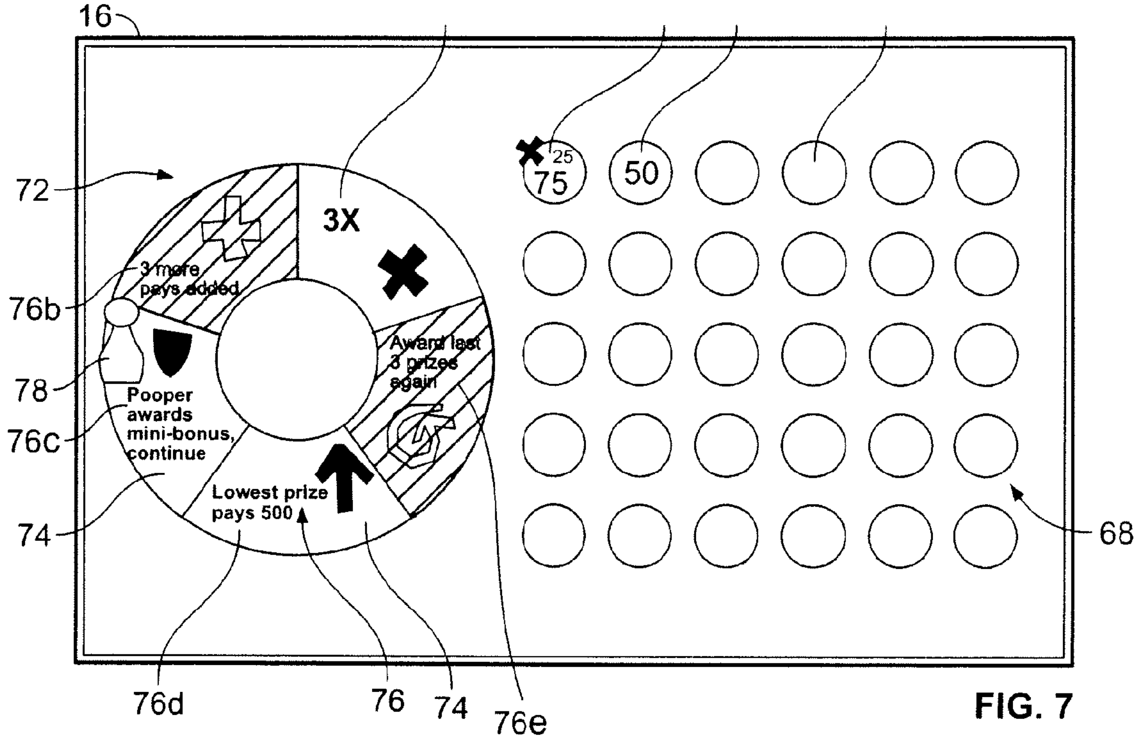

Thus, once the marker 78 lands on a space 74 that is associated with an active special rule, such as 76*a*, 76*c* and 76*d*, that special rule is applied to the outcome of a subsequent selection of a player-selectable element 70. FIG. 6 illustrates what happens when a "3X" special rule is applied to an outcome of a selection made by the player of one of the player-selectable elements 70. In this example, as the player has made a first selection 80 corresponding to an award of 25 credits, that award is multiplied by a factor of three, to modify the award for a total of 75 credits. After the player's first selection 80 is made, the marker 78 moves ahead one space 74 on the path 72, as shown in FIG. 6. As the next space corresponds to a special rule 76*b* that is not activated (based on the outcome of the basic game), the special rule will not apply to the player's second selection 82, shown in FIG. 7. In this example, the special rule 76*b* would have added three more awards and/or player-selectable elements 70 to the array 68 of player-selectable elements 70 (if the rule was in active mode).

Figure 8:
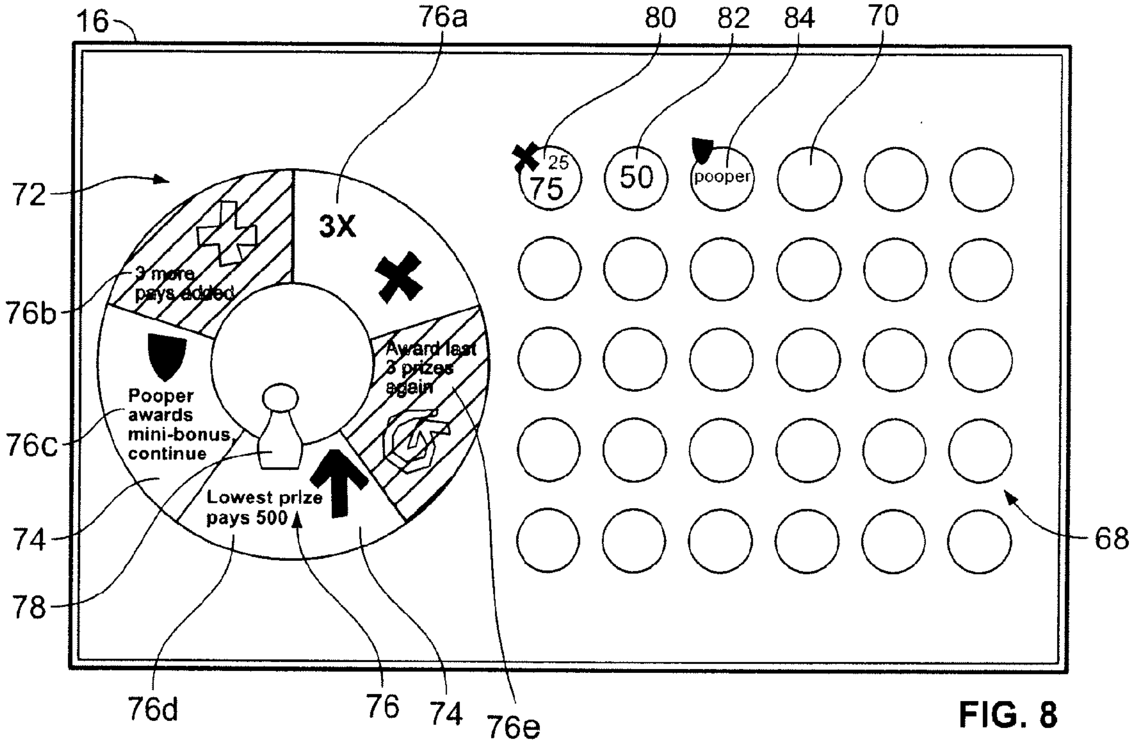

After making the second selection 82, the marker 72 moves to the next space 74 having a special rule 76*c* that, instead of ending the bonus game based on the selection of a game-terminating element, e.g., a "pooper," awards a mini-bonus award. For example, a third selection 84 made by the player results in the player earning a game-terminating element. The special rule 76*c* negates the game-terminating effect of the third selection 82 and instead awards a mini-bonus, such as a smaller credit award. In some embodiments, the symbol associated with the special rule 76 that is applied, e.g., a "X" or a "Shield" will appear next to the player's selection in the array 68 of player-selectable elements 70, such as shown in FIG. 8 with the first selection 80 and third selection 84, respectively.

The marker 78 continues to move around the path 72, modifying the bonus game outcomes via the active special rules. For example, in FIG. 8, the marker 72 located on space 74 is associated with activated special rule 76*d*, and in subsequent game play, would adjust the lowest "prize" to pay an award of 500 credits. Thus, the lowest prize contained in the array 68 of player-selectable elements 70 would be changed to 500 credits if the player selects a player-selectable element 70 having an outcome with the lowest award. The final space 74 on the path 72, in the embodiments shown in FIGS. 5-8, is associated with a special rule 76*e* that awards the last three awards again. However, this special rule would only apply when the special rule 76*e* is activated. The marker 78 continues moving around the path 72 and the player continues making selections from the array 68 of player-selectable elements 70 until the player selects a game-terminating element (without having the marker 78 concurrently located on a space with a special rule that negates the game-terminating outcome) or when all of the player-selectable elements 70 have been selected. Thus, in the embodiments described above, the resulting outcomes achieved by the player are dependent on the order of the special rules 76 in the path 72 and the order of the selections made by the player. Additionally, in some embodiments, the outcomes of the selections made by the player may be dependent on how a particular player-selectable object 70 is selected, i.e., whether the player drags a finger across the object in one direction or another direction. In this case, the player-selectable objects 70 are associated with multiple outcomes and the player determines which one of the multiple outcomes will be revealed based on the gesture made by the player when making the selection. The special rules 76 are then applied to the player's selection as discussed herein.

While it has been described that the special rules 76 affect a subsequent selection of the player-selectable elements 70, it is also contemplated that in some embodiments, the special rule 76 may affect earlier selections made by the player or future selections. In other embodiments, the player may be able to save and accumulate the special rules 76 to use in future gaming sessions. Thus, the special rules 76 earned in one gaming session may be redeemed in a later gaming session at the same or different gaming machine.

In some embodiments, instead of moving one space 74 at a time, the marker 78 may move a random number of spaces 74. The marker 78 may also change directions, either randomly, in a predetermined manner or based on an external event. In other embodiments, the marker 78 may stay on the same space 74 for more than one selection. Also, initial placement of the marker 78 on a space 74 in the path 72 may be fixed or randomly determined. Similarly, in yet other embodiments, the arrangement of the special rules 76 in the path 72 may be fixed or randomly determined. As mentioned above, the status of the special rules 76 (e.g., active or inactive) may be dependent on the outcome in the basic game, but may also be dependent on other factors, such as level of wagering, time spent at the gaming machine, etc.

Many different types of special rules 76, or power-ups, may be used with the embodiments described herein. For example, some possible types of special rules 76 may include: multiplying a selected outcome; awarding additional selections in the bonus game; nullifying a game-terminating selection and awarding a special bonus; awarding a special credit award that affects only one kind of award, i.e., the lowest award would instead pay a higher award; repeating the win, for any non-game-terminating selection, and awarding the last number (e.g., 3) of awards again; adding prizes or awards, which adds a certain number (e.g., 3) selectable elements to the array hiding the chosen award (i.e., if the player selects an award of 50 credits, three more selectable elements worth 50 credits would be added); applying a special multiplier that affects only certain kinds of prizes, e.g., red prizes; and awarding a certain number of "peeks" where the player can check prizes before selecting them. It is contemplated that there are many other types of special rules may be used with the embodiments of the present invention and the listing above is not intended to be an exclusive list of possible special rules.

Figure 9:
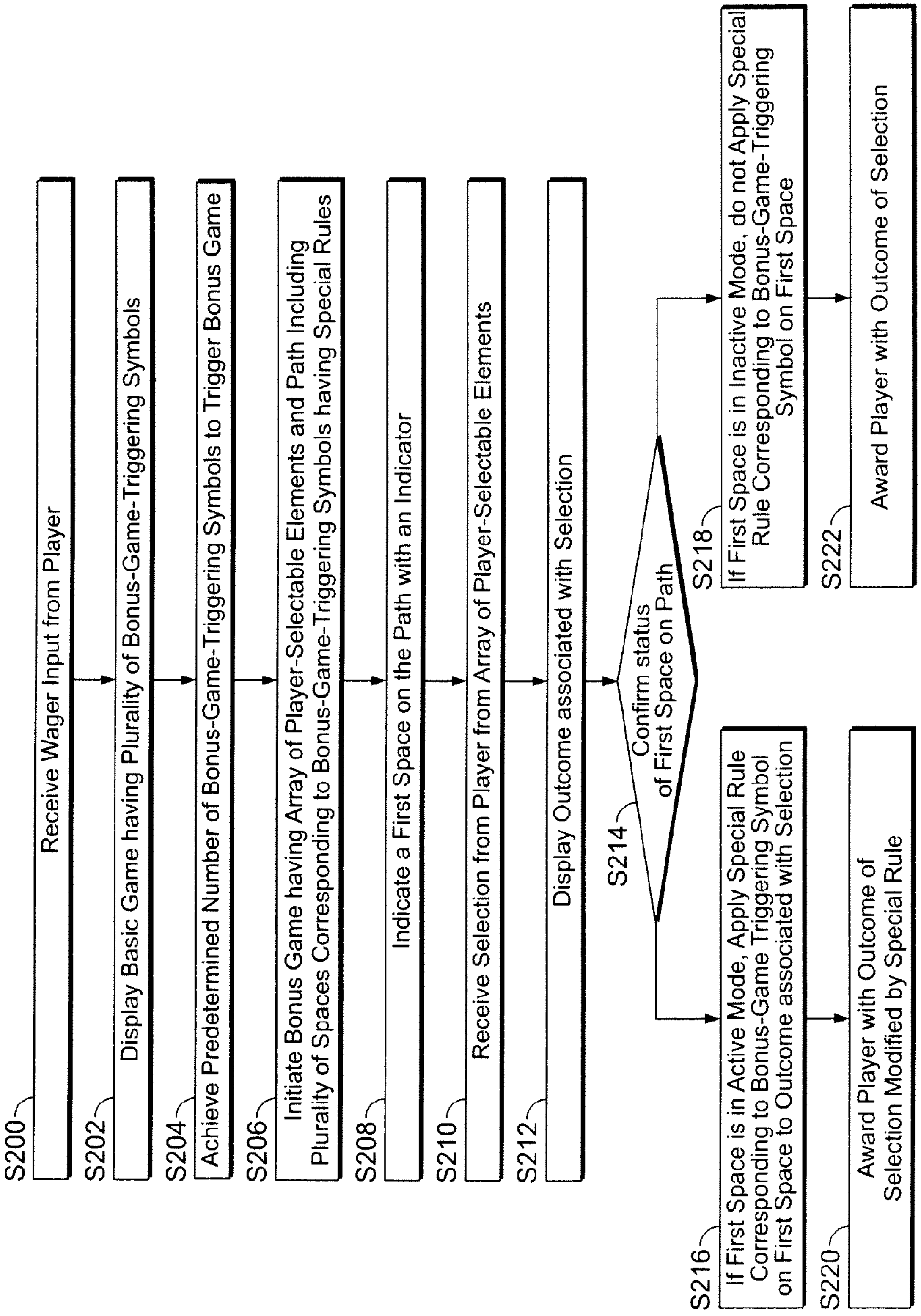
FIG. 9 is a flowchart for an algorithm that corresponds to instructions executed by a controller in accord with at least some aspects of the disclosed concepts.

FIG. 9, described by way of example above, represents one algorithm that corresponds to at least some instructions executed by the controller 34 and/or external systems 50 in FIG. 2 to perform the above described functions associated with the disclosed concepts. Under this particular embodiment, the gaming machine 10 receives a wager input via the value input device 18 (S200). Upon receiving the wager input, a basic game having a plurality of bonus-game-triggering symbols 66 (shown in FIG. 3) is displayed (S202). As the player begins play of the basic game, a predetermined number of bonus-game-triggering symbols 66 (shown in FIG. 4) may be achieved to trigger the bonus game (S204). The triggering of the bonus game initiates the display of the array 68 of player-selectable elements 70 and the path 72 including a plurality of spaces 74 corresponding to the bonus-game-triggering symbols 66 (S206) (shown in FIGS. 5-8). The spaces 74 corresponding to the bonus-game-triggering symbols 66 include special rules 76*a*-*e* for modifying outcomes associated with the player-selectable elements 70. An indicator 78 may be used to indicate one of the spaces 74 on path 72 (S208). A player may then be prompted to select one of the player-selectable elements 70 from the array 68. The selection is received (S210) and the outcome associated with the selected player-selectable element 70 is displayed (S212). The controller 34 determines if the space 74 indicated by the indicator 78 is in an active mode or an inactive mode (S214). If the indicated space 74 is in active mode, the special rule 72 corresponding to the bonus-game-triggering symbol 66 associated with the space 74 is applied to the outcome associated with the selected player-selectable element 70 (S216). This modifies the outcome to provide an enhanced outcome for the player (220). If the indicated space 74 is in inactive mode, the special rule 72 corresponding to the bonus-game-triggering symbol 66 is not applied to the outcome associated with the selected player-selectable element 70 (S218). The player is awarded the outcome without any enhancement (S222). The player may then continue making selections from the array 68 of player-selectable elements 70 until a game-terminating outcome is achieved or all of the player-selectable elements 70 have been selected.

Each of these aspects and embodiments, and obvious variations thereof, are contemplated as falling within the spirit and scope of the present disclosure and, at least some aspects of which are set forth in the following claims.

What is claimed is:

1. A method for conducting a wagering game, the wagering game including a feature having a plurality of player-selectable elements associated with respective outcomes, the feature further including a path having a plurality of spaces, the plurality of spaces being associated with respective special rules, each respective special rule capable of being active or inactive, the method comprising:

(a) using a player input device to accept input from a player for successively selecting different ones of the plurality of player-selectable elements from an array of selectable elements, each player-selectable element associated with a respective outcome;

(b) for each player-selected element and associated respective outcome, using one or more processors for identifying a space from the path of the plurality of spaces, the identified space including a special rule for modifying the respective outcome associated with the player-selected element;

(c) using the one or more processors for determining if the identified space is associated with a special rule that is active or inactive based on an outcome in the wagering game and wherein at least one of the plurality of spaces corresponds to a triggering symbol in the wagering game;

(d) using the one or more processors for modifying the respective outcome associated with each player-selected element with the special rule associated with the identified space if the special rule for the identified space is active, and wherein the active special rule is displayed to a player during play of the wagering game.

2. The method of claim 1, wherein the feature is triggered by one or more triggering symbols in the wagering game.

3. The method of claim 2, wherein the one or more triggering symbols determine which of the special rules are active in the feature.

4. The method of claim 1, wherein the special rules are selected from the group consisting of a multiplier, a credit award, an outcome-specific credit award, an outcome-specific multiplier, repeating a certain number of prior awards, adding a certain number of selectable objects to the array, nullifying a game-terminating outcome and providing a preview of the outcomes associated with a certain number of selectable elements.

5. The method of claim 1, wherein identifying includes moving a marker along the path to one of the plurality of spaces on the path, the marker moving a random or a predetermined number of spaces on the path.

6. The method of claim 5, wherein the marker changes directions randomly or based on an external event.

7. The method of claim 5, wherein the initial placement of the marker on the path is fixed or random.

8. The method of claim 1, further comprising using a computer readable storage medium encoded with instructions for directing a gaming system to perform steps (a), (b), (c) and (d).

9. A method for conducting a wagering game including a feature having an array of selectable elements associated with respective outcomes, the feature further including a path having a plurality of spaces, the plurality of spaces being associated with respective special rules and capable of being active or inactive, the method comprising:

(a) using one or more processors for indicating with an indicator a first one of the spaces of the path being associated with a respective special rule;

(b) via a player input device, receiving a selection from the array of selectable elements in the feature, the selected element revealing a respective outcome associated with the selected element;

(c) using the one or more processors to determine if the first one of the spaces of the path is associated with an active special rule based on an outcome in the wagering game and wherein at least one of the plurality of spaces corresponds to a triggering symbol in the wagering game, the active special rules being displayed to the player;

(d) applying the active special rule to the respective outcome associated with the selected element to modify the respective outcome via the one or more processors; and (e) using the one or more processors to award a player the modified outcome.

10. The method of claim 9, further comprising repeating steps (a), (b), (c), (d) and (e).

11. The method of claim 9, further comprising initiating the feature based on achieving one or more feature-triggering outcomes in the wagering game.

12. The method of claim 11, wherein the feature-triggering outcome determines which of the special rules are active.

13. The method of claim 9, wherein the special rules are selected from the group consisting of a multiplier, a credit award, an outcome-specific credit award, an outcome-specific multiplier, repeating a certain number of prior awards, adding a certain number of selectable objects to the array, nullifying a game-terminating outcome and providing a preview of the outcomes associated with a certain number of selectable elements.

14. The method of claim 9, further comprising moving the indicator to a second one of the spaces of the path and receiving an additional selection from the array of player-selectable elements and, if the second one of the spaces is associated with a special rule that is active, modifying the outcome of the player's selection according to the special rule associated with the second one of the spaces.

15. The method of claim 9, further comprising if the first one of the spaces is not associated with a special rule that is active, awarding the player the outcome of the selection without modification.

16. A gaming system comprising:

a wager input device for receiving a wager from a player to play a wagering game;

at least one display for displaying an array of selectable elements associated with respective outcomes, the at least one display also displaying a path having a plurality of spaces, at least one of the plurality of spaces corresponding to a triggering symbol in the wagering game, the spaces associated with respective modifiers for modifying the outcomes of the selectable elements, the modifiers capable of being active or inactive based on an outcome in the wagering game, the active modifiers being displayed to the player during play of the wagering game; and a player input device for successively selecting different ones of the selectable elements, wherein in response to each of the selectable elements being selected, the respective outcome of each selected element is modified by at least one of the respective modifiers if the respective modifier is active.

17. The gaming system of claim 16, wherein the array of selectable elements is displayed based on a triggering event including one or more triggering symbols.

18. The gaming system of claim 17, wherein the one or more triggering symbols determine which of the modifiers are active.

19. The gaming system of claim 16, further comprising a marker identified with the plurality of spaces on the path, wherein the marker moves around the path a predetermined or a random number of spaces.

20. A gaming system comprising:

a means for receiving a wager from a player to play a wagering game;

a means for displaying an array of selectable elements associated with respective outcomes, the displaying means also displaying a path having a plurality of spaces, at least one of the plurality of spaces corresponding to a triggering symbol in the wagering game, the spaces associated with respective modifiers for modifying the outcomes of the selectable elements, the modifiers capable of being active or inactive based on an outcome in the wagering game, at least the active modifiers being displayed to the player during play of the wagering game; and a means for successively selecting different ones of the selectable elements, wherein in response to each of the selectable elements being selected, the respective outcome of each selected element being modified by the respective modifier if the respective modifier is active.

21. The gaming system of claim 20, wherein the special rules are selected from the group consisting of a multiplier, a credit award, an outcome-specific credit award, an outcome-specific multiplier, repeating a certain number of prior awards, adding a certain number of selectable objects to the array, nullifying a game-terminating outcome and providing a preview of the outcomes associated with a certain number of selectable elements.

22. The gaming system of claim 20, wherein means for selecting includes means for the player to make selections of the selectable elements.

23. The gaming system of claim 20, wherein means for selecting includes means for randomly selecting the selectable elements.

24. A method for conducting a wagering game, the wagering game including a game sequence in which a player provides an input and a wagering game outcome is determined, the wagering game including a plurality of selectable elements associated with respective outcomes, the wagering game further including a path having a plurality of spaces, the plurality of spaces being associated with respective special rules, each respective special rule capable of being active or inactive, the active special rules being displayed to the player during play of the wagering game, the method comprising:

using a value input device to accept a player input, the value input device causing a signal to be sent to one or more processors to indicate that the player input has been received for playing the wagering game;

using at least one of the processors to initiate the game sequence of the wagering game on a gaming machine;

using at least one of the processors to execute a game code for displaying an outcome of the wagering game on a display;

using a player input device to accept input from the player for selecting a first one of the plurality of selectable elements;

for the first one of the selected elements, using at least one of the processors to identify a space of the plurality of spaces to be associated with the first one of the selected elements, at least one of the plurality of spaces corresponding to a triggering symbol in the wagering game;

using at least one of the processors to modify the outcome associated with the first one of the selected elements with the special rule associated with the identified space if the special rule for the identified space is active based on an outcome in the wagering game;

using a player input device to accept input from the player for selecting a second one of the plurality of selectable elements;

for the second one of the selected elements, using at least one of the processors to identify a space of the plurality of spaces to be associated with the second one of the selected elements; and using at least one of the processors to modify the outcome associated with the second one of the selected elements with the special rule associated with the identified space if the special rule for the identified space is active.

25. The method of claim 24, wherein the one or more processors include a plurality of processors, a first one of the processors being proximate the player input device and a second one of the processors being located remotely from the first one of the processors, and wherein a network is connected intermediate of the first one and second one of the processors.

* * * * *